(12) United States Patent
Lewis

(10) Patent No.: US 12,256,830 B2
(45) Date of Patent: Mar. 25, 2025

(54) HANDLE BRACKET

(71) Applicant: USA Broom, LLC, Dodge City, KS (US)

(72) Inventor: Jim W. Lewis, Dodge City, KS (US)

(73) Assignee: USA Broom, LLC, Dodge City, KS (US)

( * ) Notice: Subject to any disclaimer, the term of this patent is extended or adjusted under 35 U.S.C. 154(b) by 488 days.

(21) Appl. No.: 17/541,390

(22) Filed: Dec. 3, 2021

(65) Prior Publication Data

US 2023/0172349 A1    Jun. 8, 2023

(51) Int. Cl.
| | |
|---|---|
| B25G 3/12 | (2006.01) |
| A46B 5/00 | (2006.01) |
| F16B 7/18 | (2006.01) |
| A46B 7/04 | (2006.01) |
| A46B 15/00 | (2006.01) |
| B25G 1/04 | (2006.01) |
| B25G 3/20 | (2006.01) |

(52) U.S. Cl.
CPC ............... *A46B 5/002* (2013.01); *F16B 7/18* (2013.01); *A46B 5/0012* (2013.01); *A46B 7/042* (2013.01); *A46B 15/00* (2013.01); *A46B 2200/302* (2013.01); *B25G 1/04* (2013.01); *B25G 3/20* (2013.01)

(58) Field of Classification Search
CPC ..... A46B 7/042; A46B 15/00; A46B 15/0081; A47L 13/258; B25G 3/24; B25G 1/04; F16B 9/052
See application file for complete search history.

(56) References Cited

U.S. PATENT DOCUMENTS

| | | | | |
|---|---|---|---|---|
| 2,611,658 A | * | 9/1952 | Mcguire | B25G 3/12 403/195 |
| 2,922,179 A | * | 1/1960 | Lundgren | F16B 9/052 403/189 |
| 3,183,540 A | * | 5/1965 | Mccrink | B25G 3/30 403/399 |
| 4,239,413 A | * | 12/1980 | Wludyka | F16B 2/08 15/175 |
| 5,309,654 A | * | 5/1994 | Mathis | E01H 5/02 294/51 |
| 5,337,440 A | * | 8/1994 | Vosbikian | A46B 5/0095 16/440 |
| 5,502,862 A | * | 4/1996 | Vosbikian | B25G 3/30 15/176.3 |
| 5,772,354 A | * | 6/1998 | Finn | F16B 9/052 403/189 |
| 5,870,794 A | * | 2/1999 | Harpell | A46B 15/0081 7/166 |

(Continued)

OTHER PUBLICATIONS

Harper, #74 Supersweep All-purpose Broom, 36", accessed on Nov. 22, 2021 at <https://gemplers.com/products/74-supersweep-all-purpose-broom-36>, 3 pages.

(Continued)

*Primary Examiner* — Michael D Jennings
(74) *Attorney, Agent, or Firm* — Lewis Rice LLC

(57) ABSTRACT

A broom bracket for a push broom which serves to provide strength between the connection of the handle and the broom block while inhibiting the rotation of the handle relative to the block and any loosening of a threaded connection therebetween.

10 Claims, 9 Drawing Sheets

(56) References Cited

U.S. PATENT DOCUMENTS

| | | | | |
|---|---|---|---|---|
| 6,134,739 | A * | 10/2000 | Gonzalez | B25G 3/12 |
| | | | | 15/177 |
| 6,199,245 | B1 * | 3/2001 | Blessing | B25G 1/06 |
| | | | | 16/901 |
| 6,328,361 | B1 * | 12/2001 | Spear | B25G 3/14 |
| | | | | 403/361 |
| 6,393,647 | B1 * | 5/2002 | Libman | B25G 3/30 |
| | | | | 15/159.1 |
| 6,536,067 | B1 * | 3/2003 | Truan | A46B 7/04 |
| | | | | 15/202 |
| 7,690,070 | B2 * | 4/2010 | Jung | B25G 3/38 |
| | | | | 401/270 |
| 10,750,850 | B2 * | 8/2020 | Alvarez | A46B 9/02 |
| 10,959,595 | B2 * | 3/2021 | Diedrichs | A46B 5/026 |
| 2003/0031510 | A1 * | 2/2003 | Suriano | E01C 19/44 |
| | | | | 404/118 |
| 2004/0031116 | A1 * | 2/2004 | Coleman | B25G 3/04 |
| | | | | 15/175 |
| 2007/0226930 | A1 * | 10/2007 | Libman | A46B 7/04 |
| | | | | 15/159.1 |
| 2007/0266510 | A1 * | 11/2007 | Weaver | A47L 13/11 |
| | | | | 15/117 |
| 2011/0308025 | A1 * | 12/2011 | Vosbikian | A46B 7/042 |
| | | | | 15/115 |
| 2015/0223592 | A1 * | 8/2015 | Heintschel | A46B 5/005 |
| | | | | 15/144.4 |
| 2021/0100344 | A1 * | 4/2021 | Buckley | A46B 7/046 |

OTHER PUBLICATIONS

Uline, Garage Broom—30", accessed on Nov. 22, 2021 at <https://www.uline.com/Product/Detail/H-2278/Brooms-and-Brushes/>, 1 page.

* cited by examiner

HANDLE BRACKET

BACKGROUND OF THE INVENTION

1. Field of the Invention

This disclosure is related to the field of brackets and braces for interconnecting handles on hand tools. More particularly, this disclosure is related to systems and methods for bracing the handle on a conventional push broom to keep it from rotating during use.

2. Description of the Related Art

The push broom is an essentially ubiquitous tool. As opposed to a standard broom where the broom bristles are mounted to be generally parallel to the handle and particles are typically moved around using a side-to-side sweeping motion, a push broom is designed to allow for a user to push particles directly away from them. To do this, a push broom will typically have a large head (or broom block) which includes an elongated bank of bristles. The broom block is then mounted at an angle to the handle. The block is then pushed across the floor with the handle at an acute angle to the floor in front of the user with the bristles acting to push particles in front of the block away.

Push brooms are typically not useable for spot sweeping or for getting into tight spots and are typically used for cleaning large flat floor surfaces such as garages, machine shops, or patios. They are particularly useful for removing dry particles such as dirt or sawdust and come with a variety of different bristle types from soft and fine bristles for small particles on smooth surfaces to rigid and course bristles for acting on rough surfaces such as asphalt. However, specialized broom blocks are also known which can be used to sweep up spilled liquids or other materials.

Because of the variety of bristles available for different uses, and that the handle can be switched between different broom blocks for versatility, most push broom's broom blocks are designed to screw onto the handle. The handle will typically include a male threaded portion at the end which then can be screwed into a female threaded portion in the top of the broom block. It is common that a broom block may include multiple female connectors to allow for different connections. For example, it may have two which are both centered on the elongated dimension of the broom block, but arranged on opposing sides. This can allow the broom block to be reversed so that the direction the bristles will typically be pushed is reversed. This can provide for more even wear of the broom block and bristles as well as improved function and life.

The screw connection between the broom block and the handle, in theory, should hold the two tightly together as the broom handle is typically expected to move linearly with the broom block arranged generally perpendicular thereto. Therefore, the circular motion to screw and unscrew the handle from the broom block is not supposed to be present when the broom is used. However, anyone who has ever used a push broom will know, the block does tend to rotate, at least on some occasions, around the handle in the direction to loosen the connection between the broom block and the handle.

Further, as soon as the broom block rotates at all in the loosening direction, the connection between the block and the handle is loosened and they can move and flex relative to each other. This can make the broom hard to control as the flex makes the broom block travel in unexpected directions. This then requires the user to rotate the handle to screw the broom block and handle back together which can be frustrating. Further, every time the block and handle are screwed together, the connection often gets a little looser requiring the handle to be turned just a little further to secure the connection. This will slowly, but inevitably, wear it out.

To deal with this problem, many solutions have been tried. In the simplest instance, the handle is simply glued to the block. This can work well, but often the force on the broom will eventually cause the glue join to break. Further, it means that the handle cannot be readily removed from the block dramatically reducing the flexibility of the design. A number of braces or brackets have also been manufactured. For example, U.S. Pat. No. 4,239,413, the entire disclosure of which is herein incorporated by reference, provides for a bracket for interconnecting the broom block to the handle at points separate from the threaded connection.

A problem with prior designs of bracket, however, is simply the structure of the handle and broom block. The block is typically a generally parallelepiped structure so the bracket can simply attached to the top and can generally have a relatively rigid connection fairly easily. This typically works well. The handle, however, is typically of circular cross section (cylindrical design) and of relatively small diameter compared to the size of connectors such as screws. This can make it very hard to connect the bracket to the handle without damaging the handle. Specifically, trying to put screws into the handle will often create a weak point in the handle as the screws are simply too big compared to the diameter of the handle.

Thus, most broom brackets connect to the handle utilizing a collar or similar structure where the goal is simply to squeeze the outside of the handle and provide greater surface area to provide increased friction to the outside of the handle which further inhibits rotation. While this works, typically for awhile, such a connection is really just increasing the friction which already exists in the threaded connection between the block and the handle, and thus, doesn't really solve the problem.

Other brackets are designed to have increased connection rigidity by supplying teeth which are designed to penetrate into the handle along a radius through the axis of the handle. These are typically on the inside of the collar. While this also works, it typically damages the handle and has much the same problem as the use of screws. Further, the inclusion of teeth can dramatically increase the amount of time it takes to separate the bracket from the handle as the collar needs to be opened much wider to allow for the teeth to be completely pulled from the handle before the handle can be separated from the block.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Described herein, among other things, is a broom bracket for a push broom which serves to provide strength between the connection of the handle and the broom block which inhibits the rotation of the handle relative to the block and any loosing of a threaded connection therebetween. The bracket utilizes a collar which includes teeth arranged to project along a chord of the circular cross section of the handle as opposed to along a radius. This allows for ht teeth to be generally less penetrative while still holding the handle securely in place.

There is also described herein, a bracket for securing a tool to its handle, the bracket comprising: two braces, each brace comprising: an elongated extension rod having a first end and an opposing second end; a block connector positioned at said first end of said extension rod; and a handle strap including a curved portion positioned at said second end of said extension rod; wherein said curved portion includes a tooth, said tooth extending a length along a chord of a hemicircle defined by said curved portion and terminating at an end on said chord; wherein said two braces are positioned to form a collar from both said curved portions to form said bracket.

In an embodiment of said bracket, each said tooth on each of said braces is positioned so said length is positioned to generally extend along a different chord of said handle from any other said tooth on a different said brace when said two braces are positioned to form said bracket.

In an embodiment of said bracket, said chord is generally parallel to a plane of said handle strap.

In an embodiment of said bracket, said chord is generally parallel to a plane of said elongated extension rod.

In an embodiment of said bracket, said tool comprises a push broom.

In an embodiment of said bracket, said handle strap includes an intermediate portion on a first side of said curved portion interconnecting said curved portion to said extension rod and a flange portion on an opposing second side of said curved portion.

In an embodiment of said bracket, each of said flange portion and said intermediate portion includes a hole, said holes being aligned when said curved portion of a first of said two braces is aligned with a curved portion of a second of said two braces to form said collar.

In an embodiment of said bracket, each said brace is formed from a single unitary ribbon of material.

In an embodiment of said bracket, said ribbon is bent to form said extension rod, said block connector and said handle strap.

In an embodiment of said bracket, no said chord intersects an axis of any said hemicircle when said braces are positioned on said handle of said tool.

There is also described herein a push broom comprising: a broom block with a handle screwably attached thereto; two braces, each brace comprising: an elongated extension rod having a first end and an opposing second end; a block connector positioned at said first end of said extension rod; and a handle strap including a curved portion positioned at said second end of said extension rod; wherein said curved portion includes a tooth, said tooth extending a length along a chord of a hemicircle defined by said curved portion and terminating at an end on said chord; and wherein said two braces are positioned to place a handle of a tool within a collar formed from both said curved portions, are each connected to said broom block via said block connector, and are connected to each other via said handle straps.

In an embodiment of said broom, each said tooth on each of said braces is positioned so said length is positioned to generally extend along a different chord of said handle from any other said tooth on a different said brace when said two braces are positioned on said handle of said tool.

In an embodiment of said broom, said chord is generally parallel to a plane of said handle strap.

In an embodiment of said broom, said chord is generally parallel to a plane of said elongated extension rod.

In an embodiment of said broom, said handle strap includes an intermediate portion on a first side of said curved portion interconnecting said curved portion to said extension rod and a flange portion on an opposing second side of said curved portion.

In an embodiment of said broom, each of said flange portion and said intermediate portion includes a hole, said holes being aligned when said curved portion of a first of said two braces is aligned with a curved portion of a second of said two braces when said hemicircles form said collar.

In an embodiment of said broom, bolts are placed through said holes to interconnect said two braces.

In an embodiment of said broom, each said brace is formed from a single unitary ribbon of material.

In an embodiment of said broom, said ribbon is bent to form said extension rod, said block connector and said handle strap.

In an embodiment of said broom, no said chord intersects an axis of any said hemicircle when said braces are positioned on said handle of said tool.

BRIEF DESCRIPTION OF THE DRAWINGS

FIG. 3 is a side elevation view of the brackets of FIG. 1 separated from the broom.

DETAILED DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

As stated above, this disclosure is related to a handle bracket (200) that is designed to interconnect a handle of a tool with the tool end of the tool. This disclosure contemplates it being used specifically for the attachment of a broom block (101) to a handle (103) in a push boom (100). While this is believed to be a particularly useful embodiment, it is not intended to be limiting to the handle bracket (200) being used in this way. One of ordinary skill in the art would understand that the bracket (200) can be used to attach other tool heads to other handles, particularly in cases where inhibition of rotation of the tool head relative to the handle (103) is desirable.

Figure 1:
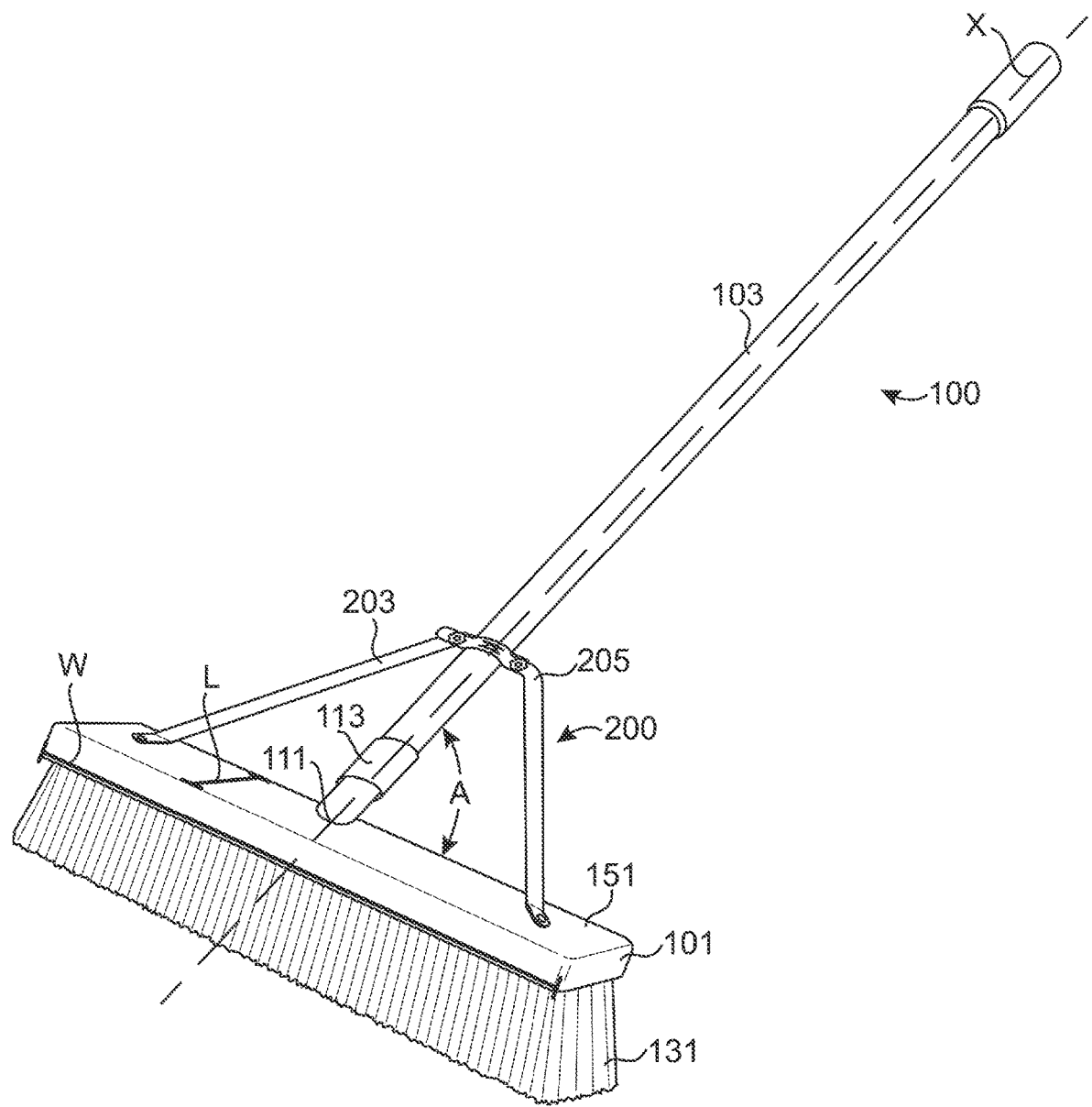
FIG. 1 is a perspective view of a push broom with an embodiment of a broom bracket in place.

FIG. 1 provides for an embodiment of a handle bracket (200) which has been positioned on a traditional push broom (100). The broom (100) comprises a broom block (101) and a handle (103). A threaded end (113) of the handle (103) has been screwed into a threaded socket (111) on the broom block (101). The broom block (101) comprises a generally rectilinear paraboloid of material which is the block support (151). In this embodiment, the block support (151) comprises wood although it may also be plastic, metal, rubber, or other sufficiently strong and shape-defined material in other embodiments. The block support (151) will typically have a width dimension (W) which is substantially greater than the length dimension (L) making it fairly elongated.

The handle (103) will typically be connected to the socket (111) at an angle (A) of between 0 and 90 degrees exclusive relative to the major plane of the block support (151) and the axis (X) of the handle (103) but will generally be perpendicular to, and generally centered within, the width dimension (W) of the block support (151). This will give the broom (100) a generally "T" shape in its major plane but with the broom block (101) angled relative to the handle in the other dimension. There will generally be a plurality of bristles (131), or other working surface, on the opposing side of the block support (151) to the attachment of the handle (103). The bristles provide the primary working surface of the broom (100).

In the embodiment of FIG. 1, there is attached a bracket (200) which further interconnects the handle (103) to the block (101). The bracket (200) comprises two braces (203) and (205). The two braces (203) and (205) are of very similar design to each other but certain components are arranged in different relative relationship as they are designed to be placed on opposite sides of the handle (103) and may be mirror images in at least one plane. In an alternative embodiment, the two braces (203) and (205) could actually be the same shape or could comprise similar, but non-mirror imaged, shapes.

Each brace comprises an extension rod (301) and (501). This is the primary structure of the brace (203) and (205) and in the depicted embodiment comprises an elongated parallelepiped in the form of a ribbon having a substantial elongated length compared to its other two dimensions. This means that the extension rod (301) and (501), as well as the other components, may comprise a generally rigid ribbon of material. The extension (301) and (501) is generally formed from a strong piece of material such as metal or plastic, but this is by no means required and may be formed of any other material which is sufficiently strong and rigid. The extension is the portion of the brace (203) or (205) which extends from the block (101) toward the handle and is suspended in the air between the two. The extension (301) and (501), however, is typically co-formed with the block connector (303) and (503) which is arranged at a first end thereof and the handle strap (305) and (505) on the second opposing end for connection to the block support (151) and handle (1031) respectively. This makes each brace (203) and (205) a single unitary piece which is effectively a single twisted ribbon of material with certain structures cut into it. In alternative embodiments, however, the various components may comprise separate elements which have been connected together by any means known to one of ordinary skill in the art including, but not limited to, adhesives, welding, or connectors.

Figure 2:
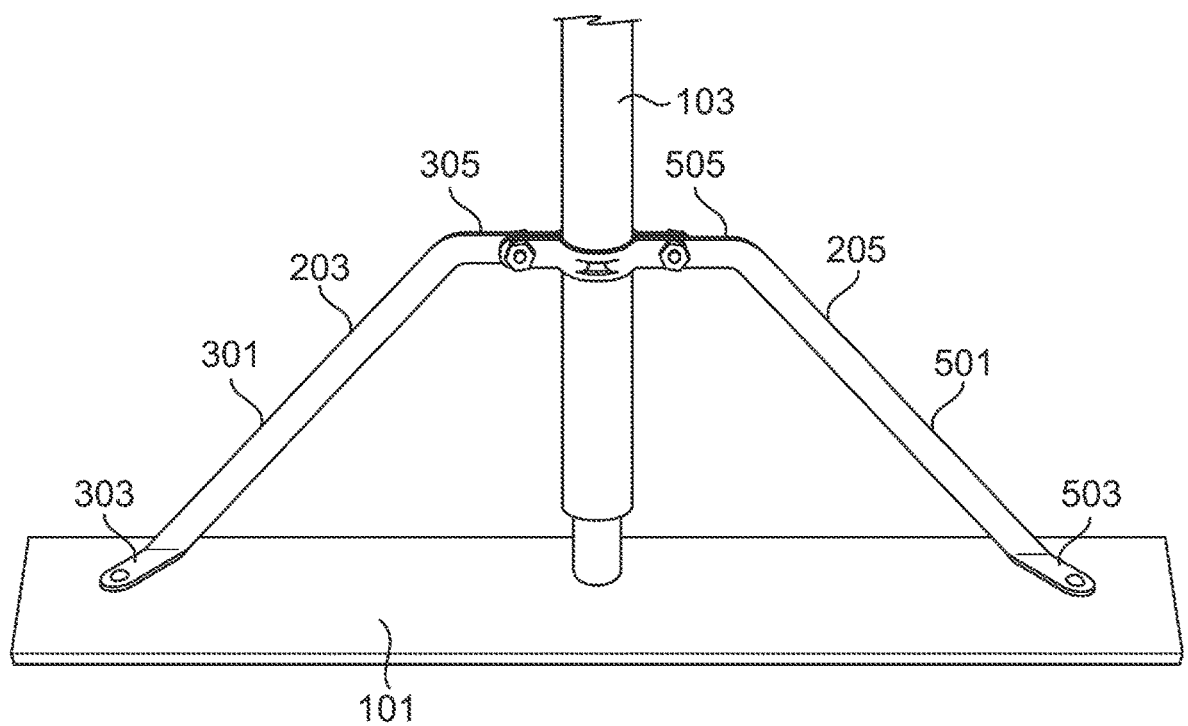
FIG. 2 is a top down view of a push broom with an embodiment of broom brackets in place.

In the depicted embodiment, the brace (203) and (205) comprises a bend in the ribbon forming the block connector (303) and (503) relative to the extension (301) and (501). The block connector (303) and (503) then includes a hole (313) and (513) which serves to allow for a bolt or screw to interconnect the block connector (303) or (503) to the block support (151) as best shown in FIG. 2. This bend forming the block connector (303) and (503) is generally of similar angle on each brace (203) and (205) but is in the opposite direction as can be best seen by comparing FIG. 4A to FIG. 5A and FIG. 4C to FIG. 5C. This makes each of the braces (203) and (205) have a "handedness" and be specific to a specific side of the broom handle (103) with brace (203) being for the right side and brace (205) being for the left side as can be seen in FIGS. 1 and 2.

As can be best seen in FIGS. 4A, 4B, 5A and 5B, the connectors (303) and (503) are bent across the two longest dimensions of the brace (203) and (205) which allows for the extension (301) and (501) to extend at an angle upward of the connector (303) and (503) when the major surface of the connector (303) and (503) is placed flat against a surface. As can be best seen in FIG. 2, this allows for the connector (303) and (503) to be attached to the upper surface of the block support (151) and have the associated extension (301) and (501) rise from the block (101) and toward a point on the handle (103) which is physically distanced from the block (101).

Figure 3:
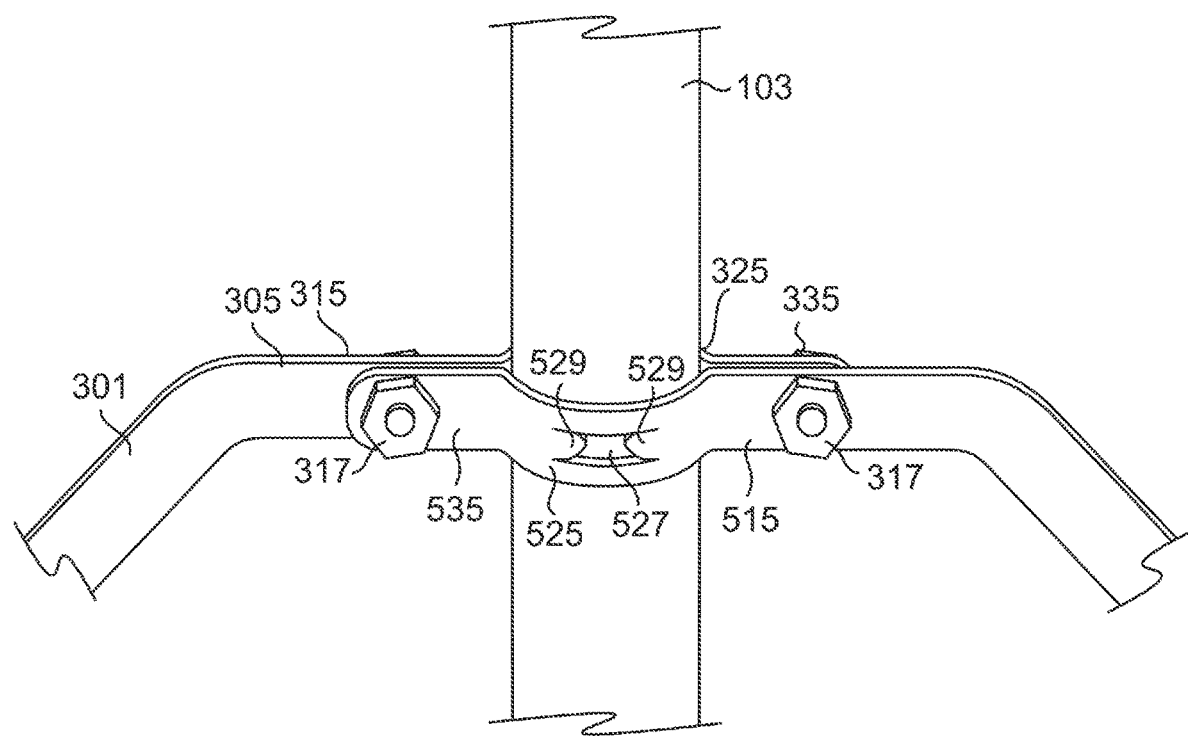
FIG. 3 is a detail view to the broom of FIG. 2 showing the connection of the bracket tines to the handle.
Figure 4A:
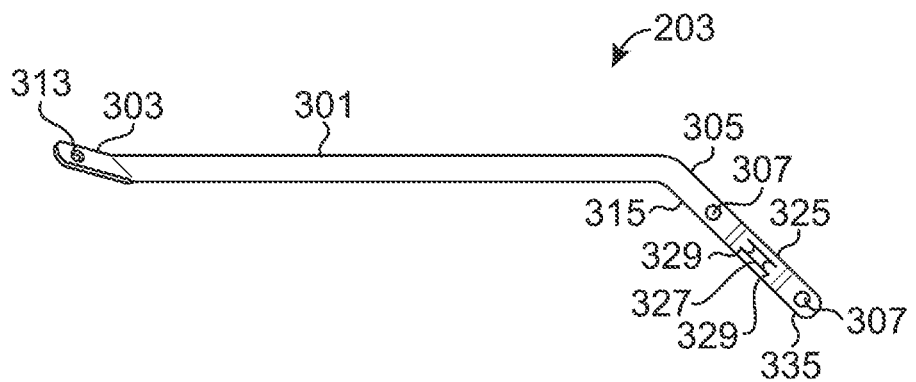
FIG. 4A shows a top view of an embodiment of a right hand brace separated from the broom.
Figure 4B:
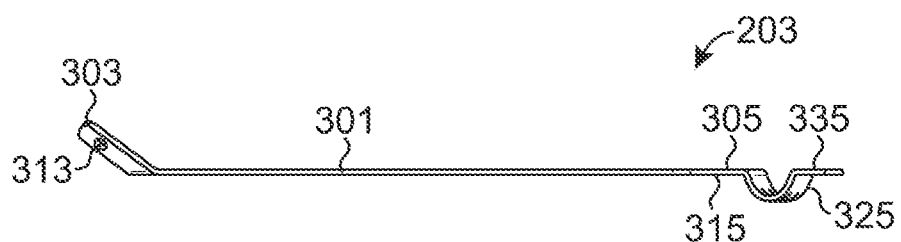
FIG. 4B shows a side view of the embodiment of FIG. 4A.
Figure 4C:
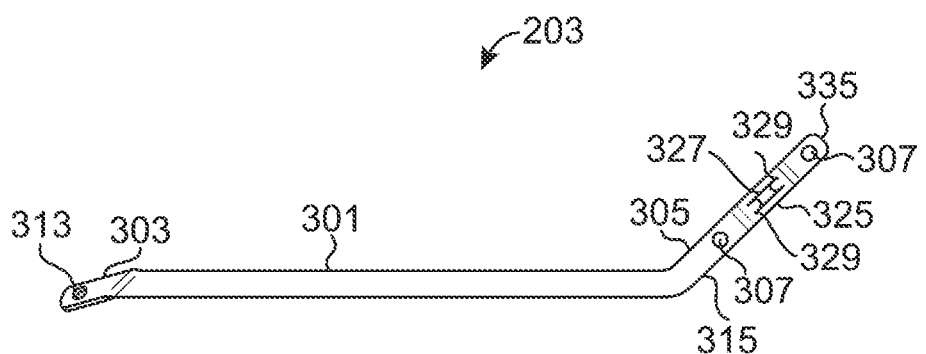
FIG. 4C shows a bottom view of the embodiment of FIG. 4A.
Figure 5A:
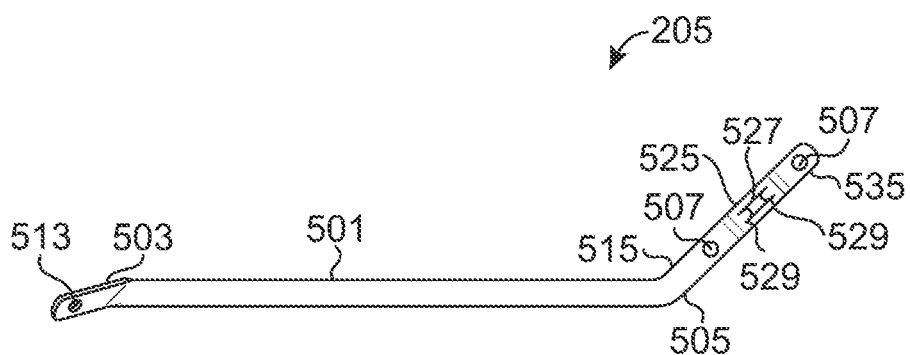
FIG. 5A shows a top view of an embodiment of a left hand brace separated from the broom.
Figure 5B:
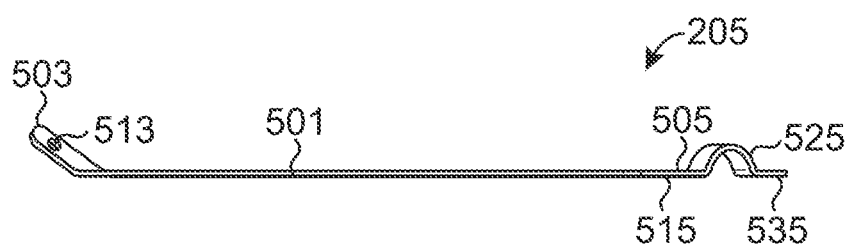
FIG. 5B shows a side view of the embodiment of FIG. 5A.
Figure 5C:
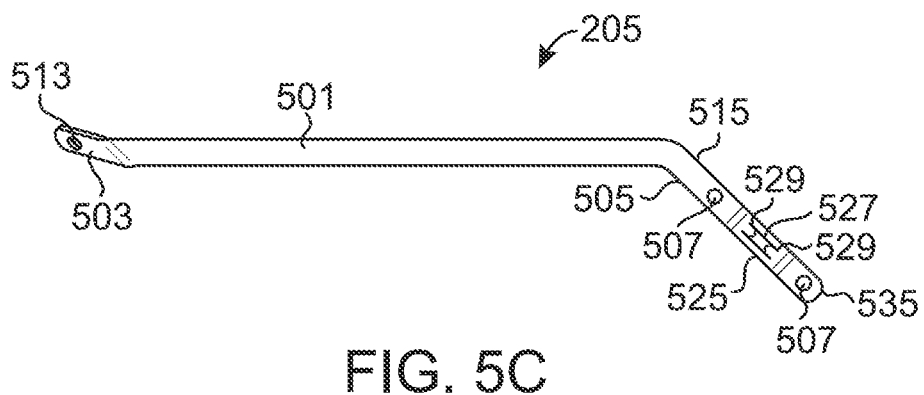
FIG. 5C shows a bottom view of the embodiment of FIG. 5A.

As can also be seen in FIG. 2 with increasing detail in FIG. 3, the handle strap (305) and (505) is designed to allow for the brace (203) and (205) to connect to the handle (103). The handle strap (305) and (505), like the block connector (303) and (503), is generally also arranged at an angle from the extension (301) and (501). In the depicted embodiment, this angle (B) is typically co-planar with the primary plane of the extension (301) and (501) as opposed to being in two dimensions relative thereto as was the case with the block connectors (303) and (503).

The handle strap (305) and (505) comprises three general elements. The first is the intermediate portion (315) and (515) which extends immediately from the extension (301) and (501). There is then a curved portion (325) and (525) which is generally hemispherical and is designed to go around the handle (103) with the two curved portions (325) and (525) forming a collar around the handle (103) when the curved portions (325) and (525) are placed adjacent each other. Finally, there is a flange portion (335) and (535) which extends from the curved portion (325) and (525) to the end. The intermediate portion (315) and (515) and the flange portion (335) and (535) are generally coplanar with each other and also typically share a common center line as can be best seen in FIGS. 4A, 4C, 5A, and 5C.

As can be best seen in FIGS. 2 and 3, each of the intermediate section (315) and (515) and the flange portion (335) and (535) includes a hole (307) and (507). These are positioned relative to the curved portion (325) and (525) such that when the two braces (203) and (205) are placed as shown in FIG. 2 with the curved portions (325) and (525) on opposing "sides" of the handle (103) to form a collar, the hole (307) in the intermediate portion (315) aligns with the hole (507) in the flange (535). Similarly, the hole (507) in the intermediate portion (515) aligns with the hole (307) in the flange (335). Bolts (317) can then be placed through the aligned holes (307) and (507) and nuts (327) can be used to secure the two braces (203) and (205) relative to each other as best shown in FIG. 3.

Figure 6:
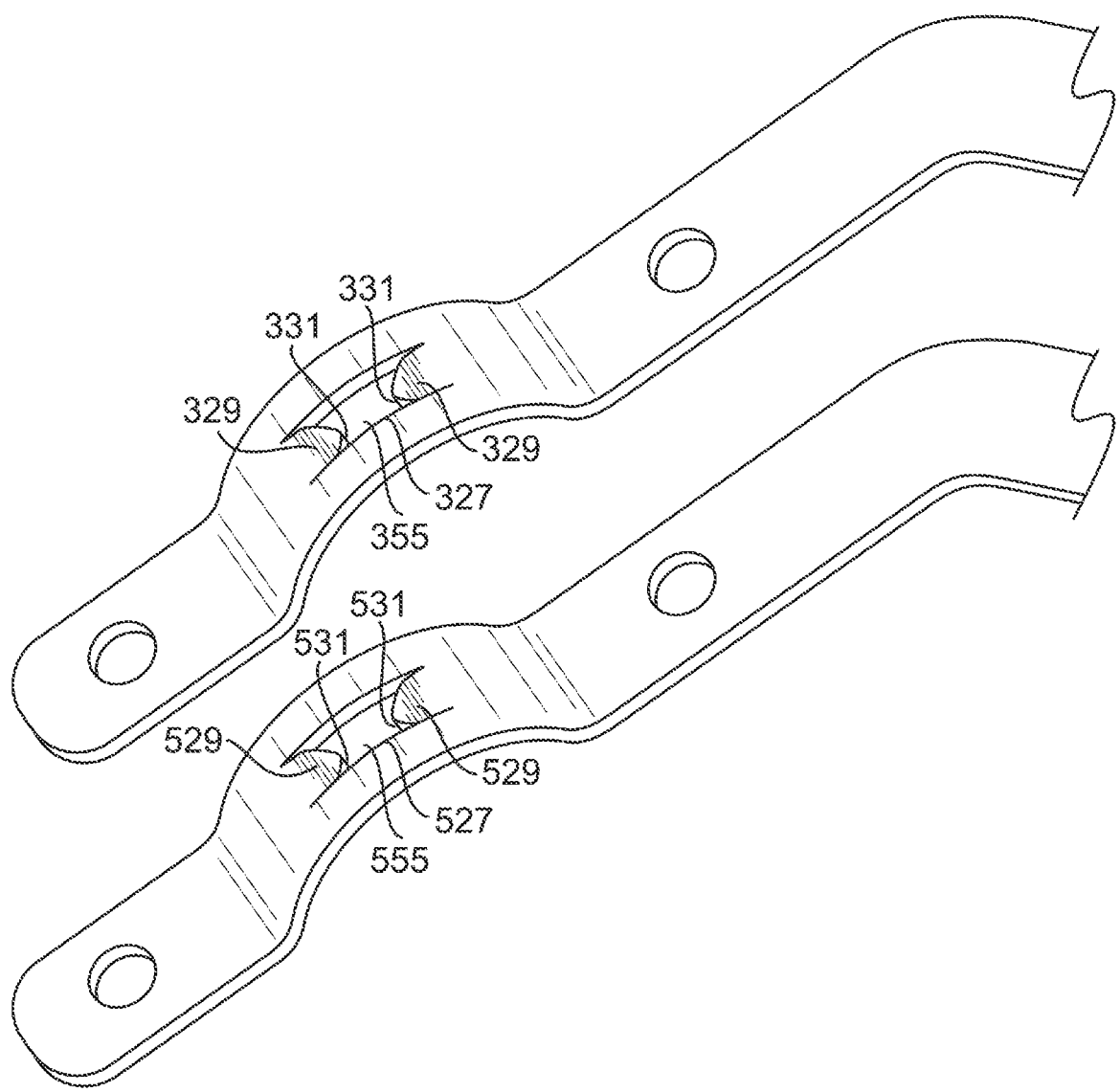
FIG. 6 shows a detail top perspective view of an embodiment of curved portions of two braces.
Figure 7:
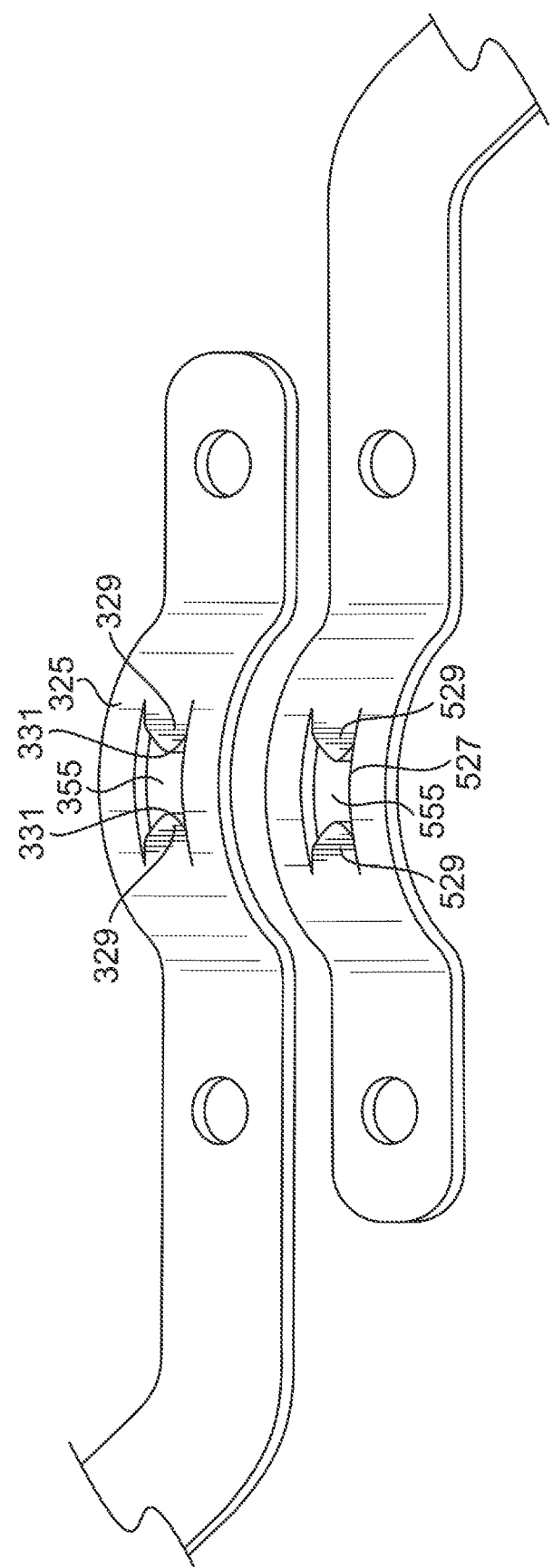
FIG. 7 shows a detail top view of the embodiment of FIG. 6.
Figure 8:
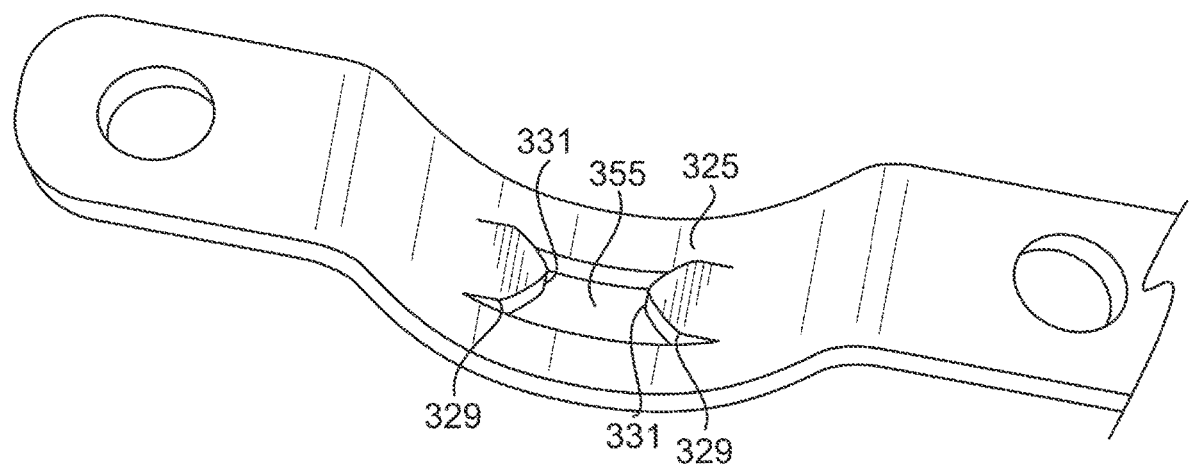
FIG. 8 shows a detail bottom view of one of the curved portions of FIG. 6.
Figure 9:
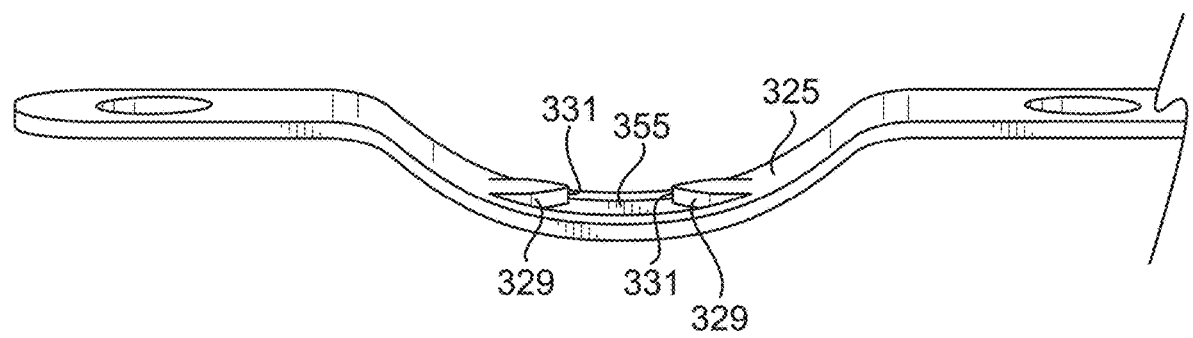
FIG. 9 shows a side view of the curved portion of FIG. 8.

While the curved portions (325) and (525) form a collar which acts to effectively encircle the handle (103), each of the curved portions (325) and (525) also includes a toothed gap (327) and (527). The toothed gap (327) and (527) comprises an opening which serves to support at least one and generally two or more teeth (329) and (529). This structure is best seen in FIGS. 6-8 and can also be seen interacting with the handle (103) in FIG. 3. The teeth (329) and (529) may be of any shape, but will generally extend from the structure of the curved portions (325) and (525) into the interior of the hemicircle. However, the teeth (329) and (529) will typically not extend along a radius of the hemicircle formed by the curved portion (325) and (525) through the axis but will instead together extend along the same chord of that hemicircle from opposing ends of the chord where it intersects the hemicircle. This chord will typically not intersect the axis of the hemicircle.

This chord will typically be arranged so as to be generally parallel but not co-planar with the primary plane of the intermediate portion (315) and (515) and flange portion (335) and (535) which, as indicated above, are typically co-planar with each other. Thus, the teeth (329) are positioned along a different chord from teeth (529). However, the chords of teeth (329) and (529) will typically be parallel to each other when the curved portions (325) and (525) are positioned adjacent to form the collar. The teeth (329) and (529) may extend at any angle into the interior of the hemicircle but will often be positioned so as to be generally parallel to the major plane of the brace (203) and (205). The ends (331) and (531) of the teeth (329) will typically be spaced from each other so as to form a gap (355) or (555) between them. The ends (331) and (531) of the teeth (329) and (529) may be pointed or more rounded, such as those depicted in FIGS. 6-8.

It should be recognized that the toothed gap (327) and (527) also need not actually comprise a gap as shown in the FIGS. However, a gap is generally preferred as it allows the teeth (329) and (529) to be formed out of the material of the brace (203) and (205) directly. Specifically, the teeth (329) and (529) may comprise all or a portion of the material that was originally in the gap (327) or (527) which has simply been cut and pressed from the structure of the curved portions (325) and (525) to form teeth (329) and (529).

In practice, when the braces (203) and (205) are aligned and connected to form a collar around a handle (103) as shown in FIGS. 2 and 3, the toothed gap (327) and (527) will be generally adjacent to the handle (103). This will cause the teeth (329) and (529) to directly engage the structure of the handle (103). Specifically, the sides of the teeth (329) and (529) will typically be pushed into the structure of the handle (103). If the brace (203) and (205) is of sufficiently rigid material compared to the structure o the handle (for example, as shown the handle (103) is wood while the brace (203) and (205) is metal) the teeth (329) and (529) will be pushed into a high friction engagement with the handle (103) and may cut into the surface of the handle (103) a small amount. The teeth (329) and (529) may also bend a small amount about the point where they connect to the circular portion (325) and (525) so as to make them be no longer co-linear with each other.

At the same time, the teeth (329) and (529) are not intended to substantially cut into the structure of the handle (103) in the way that a bolt, screw, or nail would do that is driven into the handle (103). Instead, the teeth (329) and (529) primarily engage the exterior surface of the handle (103) being pushed against it in a more tangential fashion than traditional radially arranged teeth with the recognition that there is some potential crushing of the material of the handle (103) and/or teeth (329) and (529) and some spring effect around the point of connection between the teeth (329) and (529) and the remaining structure of the curved portion (325) and (525). In effect, the teeth (329) or (529) attempt to align themselves along a chord of the handle (103) in the same general position as their chord relative to the hemicircle, but that positioning is at least somewhat resisted by the physical structure of the handle (103).

The teeth (329) and (529) will thus provide a high friction engagement against the handle (103). However, they also provide for further inhibition to rotation by their shape and placement. In particular, as best shown in the embodiment of FIGS. 6-8, the two free ends (331) and (531) will typically be positioned to face each other but have a gap (355) or (555) between them. This arrangement results in the free ends (331) and (531) being engaged directly with the material of the handle (103) and in some sense they will be dug into the material with the material in the gap (355) or (555) being raised relative to the ends (331) and (531).

Thus, should the handle (103) attempt to rotate within the interior of the collar defined by the adjacent curved portions (325) and (525), the handle (103) has to overcome both the friction with the major sides of the teeth (329) and (529) as well as needing to force the free ends (331) and (531) through a portion of the material of the surface of the handle (103). This will typically require substantially more force than overcoming the friction between the surfaces if they were purely tangential. Since this force is sufficiently high, it is also the case that it will typically not be overcome in normal operation and therefore the handle (103) will be inhibited from rotation during normal use.

While the invention has been disclosed in conjunction with a description of certain embodiments, the detailed description is intended to be illustrative and should not be understood to limit the scope of the present disclosure. As would be understood by one of ordinary skill in the art, embodiments other than those described in detail herein are encompassed by the disclosed invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "circular" are purely geometric constructs and no real-world component is a true "circular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A push broom comprising:
a broom block with a handle screwably attached thereto;
two braces, each brace comprising:
   an elongated extension rod having a first end and an opposing second end;
   a block connector positioned at said first end of said extension rod; and
   a handle strap including a curved portion positioned at said second end of said extension rod; and
   wherein said curved portion includes a pair of teeth, each tooth in said pair extending from said curved portion toward the other tooth in said pair a length along a chord of a hemicircle defined by said curved portion and terminating at an end on said chord;
wherein said two braces are positioned to place said handle within a collar formed from both said curved portions, said two braces are each connected to said broom block via said block connectors, and said two braces are connected to each other via said handle straps.

2. A push broom comprising:
a broom block with a handle screwably attached thereto;
two braces, each brace comprising:
   an elongated extension rod having a first end and an opposing second end;
   a block connector positioned at said first end of said extension rod; and
   a handle strap including a curved portion positioned at said second end of said extension rod;
   wherein said curved portion includes a tooth, said tooth extending a length along a chord of a hemicircle defined by said curved portion and terminating at an end on said chord;
wherein said two braces are positioned to place a handle of a tool within a collar formed from both said curved portions, are each connected to said broom block via said block connector, and are connected to each other via said handle straps; and
wherein, each said tooth on each of said braces is positioned so said length is positioned to generally extend along a different chord of said handle from any other said tooth on a different said brace when said two braces are positioned on said handle of said tool.

3. The broom of claim 1, wherein said chord is generally parallel to a plane of said handle strap.

4. The broom of claim 1, wherein said chord is generally parallel to a plane of said elongated extension rod.

5. The broom of claim 1, wherein said handle strap includes an intermediate portion on a first side of said curved portion interconnecting said curved portion to said extension rod and a flange portion on an opposing second side of said curved portion.

6. The broom of claim 5, wherein each of said flange portion and said intermediate portion includes a hole, said holes being aligned when said curved portion of a first of said two braces is aligned with a curved portion of a second of said two braces when said hemicircles form said collar.

7. The broom of claim 6, wherein bolts are placed through said holes to interconnect said two braces.

8. The broom of claim 1, wherein each said brace is formed from a single unitary ribbon of material.

9. The broom of claim 8, wherein said ribbon is bent to form said extension rod, said block connector and said handle strap.

10. The broom of claim 1, wherein neither of said chords intersects an axis of any said hemicircle when said braces are positioned on said handle of said tool.

* * * * *